(12) United States Patent
Lane et al.

(10) Patent No.: US 7,445,651 B2
(45) Date of Patent: Nov. 4, 2008

(54) FILTER ELEMENT

(75) Inventors: Brian Lane, Hebburn (GB); Thomas Stephen Bittle, Ponteland (GB)

(73) Assignee: Parker Hannifin Limited, Hemel Hempstead (GB)

( * ) Notice: Subject to any disclaimer, the term of this patent is extended or adjusted under 35 U.S.C. 154(b) by 105 days.

(21) Appl. No.: 11/627,676

(22) Filed: Jan. 26, 2007

(65) Prior Publication Data
US 2007/0186526 A1 Aug. 16, 2007

Related U.S. Application Data

(63) Continuation of application No. PCT/GB2005/002928, filed on Jul. 26, 2005.

(30) Foreign Application Priority Data
Aug. 5, 2004 (GB) .................................. 0417457.9

(51) Int. Cl.
*B01D 50/00* (2006.01)
(52) U.S. Cl. .............................. 55/337; 55/456; 55/476; 55/503
(58) Field of Classification Search .................. 55/337, 55/455, 456, 476, 495, 503
See application file for complete search history.

(56) References Cited

U.S. PATENT DOCUMENTS 2,801,751 A * 8/1957 Thomas ....................... 210/133
4,516,994 A * 5/1985 Kocher .......................... 55/337
5,062,952 A 11/1991 Neuman
6,309,436 B1 10/2001 Holch
6,416,563 B1 * 7/2002 Wright et al. .................. 55/513

FOREIGN PATENT DOCUMENTS

| DE | 10019293 | 10/2001 |
| EP | 0 346 301 A1 | 12/1989 |
| EP | 0 971 067 A1 | 1/2000 |
| WO | 2004009210 A1 | 1/2004 |

OTHER PUBLICATIONS

International Search Report in corresponding International Application No. PCT/GB05/002928, Jan. 19, 2005.
Search Report under Section 17 in corresponding Great Britain Patent Application No. GB0417457.9, Jan. 19, 2005.

* cited by examiner

*Primary Examiner*—Robert A Hopkins
(74) *Attorney, Agent, or Firm*—Christopher H. Hunter

(57) ABSTRACT

A filter element for removing material that is entrained in a gas stream comprises a wall of a filtration medium which defines a hollow space, for a gas stream to flow from the space through the wall. The filter element includes an end cap having an inlet tube for a gas stream to be supplied to the space. The tube has at least one helically extending rifle formation in its internal wall by which a helical flow is imparted to the gas stream when it leaves the tube.

16 Claims, 10 Drawing Sheets

FILTER ELEMENT

CROSS REFERENCE TO RELATED APPLICATIONS

This application is continuation of copending International Application No. PCT/GB05/002928 filed Jul. 26, 2005, which designated the United States, the disclosure of which is incorporated herein by reference, and which claims priority to Great Britain Patent Application 0417457.9, filed Aug. 5, 2004.

BACKGROUND OF THE INVENTION

This invention relates to a filter element for removing material that is entrained in a gas stream.

SUMMARY OF THE INVENTION

Filtration of gas in a compressed gas stream is generally required so that the gas is sufficiently clean for a subsequent application, or to minimise adverse effects of impurities on components of the system. For example, removal of compressor oil can be required to minimise chemical contamination and accumulation on valves which might lead to malfunction of the valves, and removal of particulate solid material can be required to minimise abrasion.

Coalescing filters are used to collect liquid that is entrained in a gas stream by causing aerosol droplets of the liquid to coalesce and collect as drops, which can flow as a liquid. They generally comprise several layers of filter media. For example, filter elements generally comprise a cylindrical filtration layer and a cylindrical anti-reentrainment barrier or a "drainage layer" surrounding the filtration layer on the outside of the filter element. The density and thickness of the media layers are selected according to the flow rate of the gas stream, the level and nature of the impurities in the gas stream, the level of impurity that is sought in the gas stream after filtration and so on.

Common filter constructions comprise a tubular filter element mounted in a tubular housing. The gas to be filtered passes radially through the wall of the filter element. Solid particles entering the filter housing are collected by the filter element. Liquid droplets, possibly as aerosols, entrained in the gas are collected by the filter element. The droplets can coalesce to form drops, which then collect at the base of the filter element for drainage. Clean gas can then be discharged from the filter.

Coalescing filter elements of this type can be arranged so that gas to be filtered flows radially inwardly through the filter media which provide the wall of the element. The gas is supplied to the cavity around the element, between the element and the wall of the housing. It then passes inwardly through the element for discharge from the space within the element to the end use application.

It is more common for coalescing filter elements to be arranged so that gas to be filtered flows radially outwardly through the element wall: the gas is then supplied to the cavity within the element and passes outwardly through the element wall for discharge from the space between the outer surface of the element and the wall of the housing. Elements of this latter kind are sometimes referred to as "in-to-out" filter elements, reflecting the direction of flow of gas through the filter medium.

It is preferable that contaminant material which is entrained to flow in the gas stream should be distributed evenly through the length of the filter element. PCT Application No. WO-A-2004/09210 discloses a filter element having an inlet tube which extends from an end cap into the hollow space defined by the element wall. The inlet tube can help to ensure that the gas stream, containing contaminant material, is directed to areas of the element wall which are spaced from the inlet end of the element. The disclosed filter element can have peripheral openings in its end cap for supply of the gas stream to areas of the element wall close to the inlet end. These openings can be defined by vanes which can be configured to impart a helical glow to gas flowing through the openings. A vane can also be provided in the inlet tube.

The present invention provides a filter element having an inlet tube in its end cap, which has at least one helically extending rifle formation in its internal wall by which a helical flow is imparted to the gas stream when it leaves the tube.

Accordingly, in one aspect, the invention provides a filter element for removing material that is entrained in a gas stream, the filter element comprising:

a wall of a filtration medium which defines a hollow space, for a gas stream to flow from the space through the wall, and an end cap having an inlet tube for a gas stream to be supplied to the space, the tube having at least one helically extending rifle formation in its internal wall by which a helical flow is imparted to the gas stream when it leaves the tube.

The element of the invention has the advantage that helical flow can be imparted to the gas stream by virtue of the rifle formation in the internal wall of the tube for the gas stream to tend to flow outwardly when it leaves the tube, so that it flows towards the internal wall of the filter element that is provided by the filtration medium. It appears that the helical flow that is imparted to gas entering the filter element can lead to a more even distribution of contaminant material in the gas stream over the length of the filter element: particles and droplets of contaminant material will generally tend to be relatively heavy, and the helical flow can result in them being directed further into the filter element than has been the case in known elements. Furthermore, primary separation of liquid droplets from the gas stream can be facilitated as a result of the helical flow of gas entering the element. This can facilitate collection of aerosol liquid droplets to form drops on the surface of the coalescing filter media, so that the droplets then collect within the media and flow to the base of the element. These benefits in terms of improved filtration efficiency are significant. Furthermore, it has been found that the operating lifetime of a filter element is not affected adversely by localised collection of entrained liquid droplets on the wall of the filter element close to the inlet port.

It has been found surprisingly that the helical flow that arises from the rifle formation gives rise to the sufficient outward flow of the gas stream when it leaves the tube, while giving rise to less resistance to flow of gas, and to reduced energy losses arising from the pressure drop across the element. This combination of properties can therefore give rise to reduced operating costs compared with known filter element constructions such as that disclosed in PCT Application No. WO-A-2004/09210.

The nature of a helical flow which is imparted to gas entering the hollow space within the tubular element can be characterised as a twisted flow. It can also be characterised as a cyclonic gas flow. A characteristic of the flow that is imparted to the gas is that, instead of flowing in a direction which is parallel to the element axis, the movement of the gas includes a component which involves the gas flowing around the said axis.

A further advantage of imparting a helical flow to gas entering the hollow space within the tubular element is that the reaction of the element to the helical flow imparted by the vanes can be relied on to minimise the risk of the filter element becoming detached from its housing. This advantage applies in particular for example when the filter element is fitted into its relevant housing part by a twisting action, for example relying on threaded or bayonet formations.

Preferably, the tube extends into the hollow space that is defined by the wall of the filtration medium. Preferably, the tube is approximately straight, at least in the portion of its length that is within the hollow space. Preferably the ratio of the length of the tube (measured from the inner surface of the end cap on which the tube is mounted) to the length of the filter element (measured between the inner surface of the opposite end caps) is at least about 0.15, more preferably at least about 0.20, especially at least about 0.25.

The length of the inlet tube is measured from the point on the external surface of the end cap which closes the hollow space where the inlet tube is connected to the end cap, to the end of the tube which is distal from the end cap.

Preferably, the inlet tube is co-axial with the end cap. This can aid the even distribution of the contaminated gas across the wall of the filter element. However, it will be appreciated that the inlet tube need not be co-axial with the end cap.

The inlet tube can be formed integrally with the end cap, or can be formed separately and subsequently fastened to the end cap.

It can be advantageous to form the inlet tube separately as it allows the for the production of a variety of different inlet tubes that can be fastened to standard end caps. However, it can also be advantageous to form the end cap and the inlet tube as one piece as this can reduce manufacturing costs. This can especially be the case if a variety of different inlet tubes are not used in different applications.

If the inlet tube is formed separately from the end cap, then the interface between the end cap and the inlet tube should form a fluid tight seal. Preferably, the tube and the end cap are formed form the same material. Preferably, the inlet tube can be fastened to the first end cap so that it can be subsequently removed. For example, preferably the inlet tube is fastened to the end cap through the use of a mechanical fastening such as a latch, co-operating screw threads, or engaging bayonet formations. More preferably, the inlet tube and the first end cap are shaped and sized so that the inlet tube is held within the end cap by the friction forces between the inlet tube and the end cap.

It can be advantageous in some applications to fasten the inlet tube to the end cap so that the inlet tube cannot be subsequently removed from the end cap. In this case, preferably the inlet tube is fastened to the end cap without the use of a third party material. For example, preferably, the inlet port is fastened to the end cap through the use of a welding technique, for example, ultrasonic or heat welding. However, it will be appreciated that the inlet port can be fastened to the end cap through the use of a third party material such a bonding agent, for example an adhesive.

Preferably, the end cap has an opening extending around the periphery of the inlet tube for supply of the gas stream to the element wall close to the end cap. This can be advantageous as it can aid the even distribution of contaminant material across the element wall.

The inlet tube can have at least one opening in its side wall. Preferably, the inlet tube has an upstream band, a middlestream band and a downstream band, the said bands being axially adjacent to one another and non-overlapping, having equal axial lengths of at least 5% of the length of the inlet tube, and being arranged such their planes are perpendicular to the axis of the inlet tube, and in which the proportion of the area of the side wall that is open in the upstream band is smaller than that in the middlestream band, and the proportion of the area of the side wall that is open in the middlestream band is smaller than that in the downstream band. This can help ensure that the supply of gas into the filter element is graded, which can lead to a more even distribution of gas flowing through the element wall.

Preferably, the opening in the inside wall of the inlet tube is a slit that has an open end at the downstream open end of the inlet tube and extends towards the upstream open end of the inlet tube. Preferably, the slit extends parallel to the axis of the inlet tube. However, the slit can extend at an angle to the axis of the inlet tube. For example, the slit can be a helically extending slit. It has been found that a helically extended slit can provide a more even distribution of contaminated material around the element wall. Preferably, the helix angle defined by the slit is at least about 5°, or preferably at least about 10°, especially at least about 15°, for example at least about 20°. Preferably, the helix angle defined by the formation is not more than about 75°, but preferably not more than about 60°, for example, not more than about 50°. The helix angle is the angle between a straight line projecting substantially along a portion of the slit (when viewed from the side) and the plane which is perpendicular to the axis of the tube.

Preferably, the helically extending slit extends around the tube axis through at least about 360° between its ends, more preferably, at least about 720°, for example at least about 1080°. However, it will be appreciated that the helically extending slit need not extend through at least about 360° between its ends. For example, the helically extending slit can extend through at most about 180° between its ends.

Preferably, the width of the helically extending slit perpendicular to the direction of the slit increases towards the downstream open end. However, the helically extending slit need not be wider towards its downstream end. For example, the helically extending slit can be arranged so that the helix angle defined by the slit towards its downstream end is shallower than towards its upstream end, thereby providing a tighter helix towards its downstream end, and therefore the proportion of the side wall that is open increases towards the downstream end.

Preferably, the number of slits in the side wall of the inlet tube is more than one. Preferably, the number of slits provided in the side wall of the inner tube is between two and ten, more preferably, between four and eight, especially preferably, between five and seven, for example, six.

When there is more than one slit, preferably, the slits are spaced equally around the inlet tube. For example, when there are two slits, preferably, the slits are spaced apart from each other by about 180° around the inlet tube. When there are four slits, preferably, the slits are spaced apart from each other by about 90° around the inlet tube. This can help ensure that a gas stream entering the filter element is distributed evenly around the wall of the filter element.

Preferably, when there is more than one slit in the side wall of the inlet tube, the upstream most points of the slits define a plane perpendicular to the axis of the inlet tube and the width of at least one slit increases as you travel from its upstream most point to its downstream open end. However, this need not be the case. For example, the upstream most points of the slits can be staggered along the length of the inlet tube so the slits do not all extend the same axial distance from the downstream open end to the upstream open end of the inlet tube.

Preferably, when more than one slit is provided in the side wall of the inlet tube, the shape and configuration of the slits are identical. However, this need not be the case. For example, the width of a first slit may be wider at its downstream most point than that of a second slit. Further, a first slit may extend generally helically around the inlet tube, and a second slit may extend generally parallel to the axis of the inlet tube.

When more than one slit is provided in the side wall of the inlet tube, the width of the slits need not increase towards the downstream end. For example, the slits may extend towards the upstream open end of the inlet tube for different axial lengths so that the number of slits present in the upstream band is less than the number present in the middlestream band, and the number of slits present in the middle stream band is less than the number present in the downstream band.

The at least one opening in the side wall can be an aperture that extends generally transversely through the side wall so that it is surrounded by the side wall. When there is only one aperture the size of the aperture will increase towards the downstream end of the tube.

Preferably, there are a plurality of apertures. For example, preferably the number of apertures is at least 2, more preferably at least 10, for example at least 20 or 25. There can be less than about 75 apertures, preferably less than about 50 apertures, more preferably less than about 40 apertures, for example less than about 25 apertures.

Preferably, the apertures are arranged such that the number of apertures located in the upstream band is less than the number of apertures in the middlestream band, and the number of apertures in the middlestream band is less than the number of apertures in the downstream band. Preferably, the size of the apertures are equal. However, it will be appreciated that the size of the apertures can vary. For example, the number of apertures in the upstream, middlestream and downstream bands can be equal, and the size of the apertures in the upstream band can be smaller than the size of the apertures in the middle-stream band, and the size of the apertures in the middlestream band can be smaller than the size of the apertures in the downstream band.

The shape of the apertures can be any regular or irregular shape. Preferably, the apertures are circular, for example, elliptical. However, the apertures can be any shape such as square, hexagonal, and can be configured so that the apertures extend helically around the inlet tube. Preferably, the shape of the apertures are the same. However, it will be appreciated that the apertures need not be the same shape as each other. For example, at least one aperture may be circular, and at least another aperture can be hexagonal.

Preferably, the apertures are arranged so that, within each band, the apertures are equally spaced around the inlet tube. For example, if there are four apertures present in the upstream band, preferably, they are spaced apart from each other by about 90° around the inlet tube. Preferably, the apertures are arranged so that, within each band, the points at the centres of the apertures define a plane that extends perpendicular to the axis of the inlet tube.

Preferably, when there is more than one opening, the openings are either all slits or all apertures. However, when there is more than one opening, at least one opening can be a slit and at least one opening can be an aperture.

Details of a filter element having an inlet tube with at least one opening in its side wall are disclosed in the co-pending PCT application filed with the present application which claims priority from UK Patent Application No. 0417462.9. Subject matter that is disclosed in that application is incorporated in the specification of the present application by this reference.

The rifle formation can be provided by at least one ridge which is provided on the internal wall of the tube. The ridge can be tapered towards a point at least one of its ends, preferably at each of its ends. This can reduce the resistance to flow of the gas stream over the ridge.

The rifle formation can be provided by a plurality of ridges. Preferably, when the rifle formation is provided by more than one ridge, the plurality of ridges are arranged so that adjacent ridges are spaced apart approximately equally around the inlet tube, i.e. the distance between each ridge is approximately constant over the length of the ridges. Preferably, the number or ridges provided is at least two, more preferably at least four, for example at least six or at least 10. Preferably, the number of ridges is less than 30, more preferably less than 20, for example less than 15.

The rifle formation can be provided by at least one groove which is provided on the internal wall of the tube. The groove can be defined by two ridges which are provided on the internal wall of the tube.

The rifle formation can be provided by a plurality of grooves. The plurality of grooves are arranged so that adjacent grooves are spaced apart approximately equally around the inlet tube. Preferably, the number or grooves provided is at least two, more preferably at least four, for example at least six or at least 10. Preferably, the number of grooves is less than 30, more preferably less than 20, for example less than 15.

Preferably, the helix angle defined by the formation is at least about 5°, more preferably at least about 10°, especially at least about 15°, for example at least about 20°. Preferably, the helix angle defined by the formation is not more than about 75°, more preferably not more than about 60°, for example not more than about 50°. The helix angle is the angle between a straight line projecting substantially along a portion of the crest of the formation (when viewed from the side), and the plane which is perpendicular to the axis of the tube. The helix angle will be selected according to the desired helical flow that is to be imparted to the gas stream, balanced again the resistance to the flow of the gas stream that arises from the presence in the tube of the formation.

Preferably, the rifling formation extends only part way along the length of the tube. Preferably the ratio axial length of the rifling formation to the axial length of the tube is not more than 0.75. More preferably, the ratio axial length of the rifling formation to the axial length of the tube is not more than 0.65. Especially preferably, the ratio axial length of the rifling formation to the axial length of the tube is not more than 0.5.

Preferably, the rifle formation extends through at least about 360° between its ends, for example at least about 720°. However, it will be appreciated that the rifle formation need not extend through at least about 360° between its ends. For example, the rifle formation can extend through at most about 180° between its ends.

Preferably, when the rifle formation is provided by more than one groove or ridge, each groove or ridge extends through at least about 360° between its ends, for example at least about 720°. However, it will be appreciated that each groove or ridge need not extend through at least about 360° between its ends. This can be particularly advantageous when a large number of grooves or ridges are provided. For example, each groove or ridge can extend through at most 270° between its ends, preferably, at most 180° between its ends.

Preferably, the ratio of the depth of the rifle formation to the transverse dimension of the tube (which will be its diameter when the cross-section of the tube is circular) is at least about 0.02, more preferably at least about 0.05. Preferably, the ratio of the depth of the rifle formation to the transverse dimension of the tube is not more than about 0.3, more preferably at least about 0.1.

Preferably, the depth of the rifle formation is at least about 0.5 mm, more preferably at least about 1.0 mm. Preferably, the depth of the rifle formation is at most about 5.0 mm, more preferably at most about 2.5 mm.

Materials suitable for use in a filtration filter element will be selected according to the nature of the gas that is being filtered, the nature of the contaminants (liquid droplets, aerosols, solid particles etc) to be filtered from the gas, the pressure differential across the filter and so on. Such materials are known, including those used by Domnick Hunter Limited in products which are available under the trade mark OIL-X. Suitable materials for use as a filtration medium (or a filtration layer) include, borosilicate and other glass fibres, activated carbon minerals, activated silica materials and so on. A filtration layer can be made from woven fibres. However, as will be appreciated, a filtration layer can be made from sheets of non-woven fibres. For example, a microfiber filtration layer made from fine organic or inorganic fibres is preferred. Preferably, a coarser fibre layer is fitted on the inside of a microfiber filtration layer. This coarser layer can protect a microfiber filtration layer from gross pollution.

Preferably, the filtration layer can comprise a layer of a material which has been folded so that it is fluted (or pleated). This can increase the surface area of the filtration layer through which air flowing through the filter element will pass. This can also help to increase the rigidity of the filtration layer.

The filtration layer can be surrounded by an "anti-reentrainment" or drainage layer on its outside. Drainage layers are especially used in filter elements where the nature of the contaminants to be filtered from the gas is in the form of aerosols, or liquid droplets. The drainage of filter element can be any material that is capable of retaining liquid that has been coalesced by the filtration layer, and is carried to the drainage layer by a gas stream that flows through the drainage layer. The drainage layer of the filter element will generally be porous, and made from a material which encourages flow of coalesced liquid towards the base of the filter element. Factors affecting the drainage characteristics include pore size and structure, and the material of the drainage layer, including for example the surface energy of liquid which is in contact with the material. Materials suitable for use in the drainage layer are used in similar products sold by Domnick Hunter Limited under the trade mark OIL-X. Suitable materials include open-celled foam plastics, felted fabric material, and expanded foam materials.

The element can include at least one support for the filtration layer. This can help to retain the filtration layer in its position within the filter element. This can also increase the rigidity of the filter element. A support can be provided within the hollow space, positioned against the internal surface of the filtration layer. A support can be positioned outside the filtration layer, for example between the filtration layer and the drainage layer. Preferably, a first support made of a rigid material is positioned within the hollow space against the internal surface of the filtration layer, and a second support made of rigid material is positioned outside the filtration layer. Preferably, the or each support is perforated to allow a gas stream to flow therethrough. The material for the support should have sufficient rigidity to withstand the forces to which the element is exposed, during assembly of the element and an assembly containing the element, and during use. The material can be metallic, for example a stainless steel.

Preferably, the filter element has a substantially constant cross-sectional shape along its length. Preferably, the cross-section of the filter element is generally round. For example, the filter element may be circular or elliptical. However, it will be appreciated that the cross-section of the filter element need not be round. For example, the cross-section could be the shape of a square, triangle, or any other regular or irregular shape.

The shape of the filter element when viewed along its axis (its cross-section shape) will generally be approximately constant over at least most of the length of the element. However, it will be appreciated that its cross-section shape need not be constant. For example, the filter element could be conical or pyramidal.

Generally, the filter element will include first and second end caps at opposite ends of the wall of the filtration medium, with the inlet tube provided on the first end cap. Generally, the filter element will be arranged in use with the first end cap located above the second end cap, when the first end cap might be referred to as the top end cap, and the second end cap referred to as the bottom end cap.

The cross-sections of the end caps and the wall at their interfaces should be broadly the same so that the end caps can be fitted together with the wall to provide fluid tight seals. Preferably, the filtration and drainage layers are retained and sealed within a trough which is provided in the first end cap, so that there is no path for gas to flow past the filtration medium.

When a second end cap is provided, it can be preferred for the filtration layer to be retained and sealed within a trough which is provided in the second end cap, so that there is no path for gas to flow past the filtration medium. Preferably, the drainage layer extends from the wall of the filter element over at least a part of the external surface of second end cap, over the face thereof which faces away from the first end cap. This can facilitate drainage of coalesced fluid from the drainage layer of the filter element, into a reservoir in the assembly from which it can be collected, for example for disposal. Details of a filter element in which the drainage layer extends from the wall of the filter element over at least a part of the external surface of second end cap, over the face thereof which faces away from the first end cap are disclosed in the co-pending PCT application filed with the present application which claims priority from UK Patent Application No. 0417455.3. Subject matter that is disclosed in that application is incorporated in the specification of the present application by this reference.

The drainage medium (or one or more layers thereof) can be sealed to an end cap using a quantity of a bonding material such as an adhesive. The bonding material should be selected according to fluids with which the element will come into contact when in use so that there are no adverse reactions between the bonding material and the fluids. The drainage medium might be sealed to the first end cap using other techniques such as welding, for example by localised application of heat, or by ultrasonic welding.

Preferably one or each of the end caps is formed from a polymeric material. Preferred polymeric materials include polyolefins (especially polyethylene and polypropylene), polyesters, polyamides, polycarbonates and the like. Polymeric materials used for the end caps can be reinforced, for example by fibrous materials (especially glass fibres or carbon fibres). Materials other than polymeric materials can be used, for example metals. The first and second end caps will generally be formed from the same material or materials.

Preferably one or each of the end caps is formed by moulding, for example, by injection moulding.

Preferably, the second end cap includes an upstand portion which extends towards the first end cap, into the space within the filter element. This can help to encourage fluid to flow transversely towards the wall of the element. Preferably, the upstand portion is located centrally within the element.

Preferably, the upstand portion of the second end cap tapers inwardly towards the end thereof which is closer to the first end cap. The upstand portion can have a substantially constant cross-sectional shape along its length. Preferably, the cross-section of the upstand portion is generally round, for example elliptical or especially circular.

When the second end cap includes an upstand portion that has a circular cross-section, and when the second end cap includes a flange and a stem, preferably the stem and the upstand portion are co-axial, and preferably the diameter of the upstand portion is the same as that of the stem. This can ease construction of the second end cap, especially when the second end cap is formed by moulding.

In another aspect, the invention provides a filter assembly for collecting material that is entrained in a gas stream which comprises a filter element as discussed above, and a housing in which the filter element is received.

The housing can comprise a head and a body. The head and the body can be separable, providing access to the interior of the housing, especially for replacement of the filter element. The head and body should be capable of being connected to one another to form a fluid tight seal, for example by means of cooperating bayonet formations or by means of cooperating screw threads.

The housing should provide an inlet port for a gas stream to flow into the housing, and an outlet port through which gas which has passed through the filtration medium can leave the housing. The ports will generally be provided in the housing head.

Preferably, the end cap, or when provided, the second end cap (or each of the end caps), has means for locating the filter element in the housing of the filter assembly, especially to control the alignment of the element in the housing. For example, the end cap can have at least one rib which is received in an appropriate groove in a housing. When the end cap has the rib, this can also facilitate the loosening of the filter element from the housing head part when the housing body is rotated relative to the housing head part. Details of a filter assembly in which the end cap has at least one rib that is received within an appropriate groove in the housing are disclosed in the co-pending PCT application filed with the present application which claims priority from UK Patent Application Nos. 0417463.7 and 0428567.2. Subject matter that is disclosed in that application is incorporated in the specification of the present application by this reference.

Preferably, the housing includes a reservoir in which coalesced liquid which drains from the drainage layer can collect. The reservoir can be provided by a space within the housing below the filter element.

Preferably, the housing includes a drain outlet for coalesced liquid which drains from the drainage layer. The outlet will generally provide for removal of liquid which has collected in a reservoir. The drain should preferably be capable of opening without depressurising the housing. A suitable drain mechanism is disclosed in European Patent No. EP-A-81826.

The housing should be formed from a material which is capable of withstanding the internal pressures to which it is subjected when in use. Metals will often be preferred, for example aluminium and alloys thereof, and certain steels.

The inlet at the end cap of the filter element should be capable of coupling with a part in a housing for the element so that a tight seal is formed. This can ensure that all gas that enters the inlet of the filter assembly, enters the filter element.

Techniques for sealing inlet ports are known, for example as disclosed in PCT Application No. WO-A-99/30798.

Preferably, the parts of the housing fit together for the purposes of connection in such a way that the body part as a male part fits within the head part as a female part.

Preferably, the inlet on the end cap of the filter element has a compressible O-ring seal for forming a fluid tight seal with the head part of the housing.

A flow conduit having a first conduit opening for communication with a port (generally the inlet port in the housing head) for the gas that is to be filtered and a second conduit opening for communication with the inlet tube of the end cap, can be provided. Generally, the flow of the gas stream towards and away from the assembly will be horizontal. The filter element will generally be arranged vertically so that the housing head is at the top of the housing with the filter element located depending below it. In such constructions, the axis of the first conduit opening and the axis of the second conduit opening will not be aligned. Generally, the axis of the first conduit opening will be substantially perpendicular to the axis of the second conduit opening.

Preferably, the flow conduit will be configured to provide a smooth flow path for a gas which flows between the first and second conduit openings. The smooth flow path can be constructed to reduce restriction of the flow of the gas stream compared for example with a flow conduit which presents a discontinuous flow path which is sharply angled or contains steps or other obstructions.

The flow conduit can be provided as part of the end cap. However, preferably the flow conduit is formed separately from the end cap and subsequently fastened to the end cap. This can reduce the costs of manufacturing the end cap, especially when the end cap and flow conduit and formed by a moulding process. The interface between the inlet in the filter element and the flow conduit should form a fluid tight seal to ensure that all gas that flows through the flow conduit enters the filter element. Preferably, the flow conduit and the end cap are formed form the same material. Preferably, the flow conduit can be fastened to the end cap so that it can be subsequently removed. For example, preferably the flow conduit is fastened to the end cap through the use of a mechanical fastening such as a latch, co-operating screw threads, or engaging bayonet formations. More preferably, the flow conduit and the end cap are shaped and sized so that the flow conduit is held within the end cap by the friction forces between the flow conduit and the end cap.

Preferably, the flow conduit extends into the head part of the housing when the assembly is assembled. A seal can be provided in one or both of the surfaces of the housing and the flow conduit which contact one another. For example, a seal can be provided in a face of the flow conduit around the first conduit opening. The seal can be provided in a groove in that face. It can be provided as a separable component of the flow conduit. It might be formed as an integral part of the flow conduit, for example as a result of being formed by moulding in place. The material for seals in an assembly according to the invention will be selected according to the application for the assembly; the seal will generally be provided by an elastomeric material.

The head part can present a bore in which the end of the flow conduit is received. Preferably, the head part of the housing has internal walls which define a primary chamber within it which communicates with one of the ports and also with the hollow space within the tubular filter element. Generally, the axis of the port and the axis of the tubular filter element will not be aligned. Preferably, a seal is provided between the internal wall of the primary chamber at or towards the free end thereof and the flow conduit at the second conduit opening thereof. Preferably, the flow conduit extends from the hollow space into the primary chamber. It has been found the provision of a flow conduit that extends from the hollow space into the primary chamber can give rise to significant advantages, including that any turbulence in the flow of gas within the chamber between the port and the hollow space resulting from the non-alignment of the axes can be reduced. Further, such an assembly has fewer constraints on the design of the head part with a view to minimising flow resistance compared with other assemblies, such as that disclosed in PCT Application No. WO-02/38247. Details of a filter assembly having a primary chamber into which the flow conduit extends are disclosed in the co-pending PCT application filed with the present application which claims priority from UK Patent Application No. 0417458.7. Subject matter that is disclosed in that application is incorporated in the specification of the present application by this reference.

The flow conduit can be made with additional features during its manufacture. For example, a port might be formed in it for connection to means for indicating the pressure within the conduit. Such ports are known, for example as disclosed in PCT Application No. WO-A-99/30798. Details of an alternative arrangement for such a port are disclosed in the co-pending PCT application filed with the present application which claims priority from UK Patent Application No. 0417458.7. Subject matter that is disclosed in that application is incorporated in the specification of the present application by this reference.

The flow conduit can contain at least one vane positioned within it so that the flow of gas along the conduit between the first and second conduit openings passes over the vane and is smoothed by it. The provision of a vane in the flow conduit has been found to reduce the resistance to flow of gas through the flow conduit compared with a flow conduit which does not include a vane. This can enable the efficiency of a filter element to be enhanced compared with known assemblies of this general kind. Details of a filter assembly having a flow conduit which has a vane are disclosed in the co-pending PCT application filed with the present application which claims priority from UK Patent Application No. 0417464.5. Subject matter that is disclosed in that application is incorporated in the specification of the present application by this reference.

Preferably, the flow conduit contains at least two of the said vanes.

The flow conduit can be formed in first and second matable pieces, in which the first piece comprises a first part of the flow conduit wall and the vane, and the second piece comprises a second part of the flow conduit wall which has a recess formed in it in which the end of the vane that is remote from the first part of the conduit wall can be received when the first and second pieces are mated. Preferably, the first and second matable pieces of the flow conduit mate in a plane which contains the first and second conduit openings. Details of a filter assembly in which the flow conduit can be formed in first and second matable pieces is disclosed are disclosed in the co-pending PCT application filed with the present application which claims priority from UK Patent Application No. 0417464.5. Subject matter that is disclosed in that application is incorporated in the specification of the present application by this reference.

When a second end cap is provided, and when the drainage layer extends from the wall of the filter element over at least a part of the external surface of second end cap, over the face thereof which faces away from the first end cap, the part of the drainage layer between the second end cap and the housing can be compressed by at least one longitudinally extending fin. This can facilitate drainage of coalesced fluid from the drainage layer of the filter element, into a reservoir in the assembly from which it can be collected, for example for disposal. The effective engagement of the housing wall with the second end cap, through the fin and the drainage layer, can also help to locate the filter element in the housing transversely. This can facilitate the formation of a reliable seal between the housing and the filter element which might otherwise be disturbed if the element is able to move transversely within the housing. The transverse location of the element in the housing operates in conjunction with the axial location provided by the interengaging rib and groove. Details of a filter assembly in which the part of the drainage layer between the second end cap and the housing are compressed by at least one longitudinally extending fin are disclosed in the co-pending PCT application filed with the present application which claims priority from UK Patent Application No. 0417459.5. Subject matter that is disclosed in that application is incorporated in the specification of the present application by this reference.

BRIEF DESCRIPTION OF THE DRAWINGS

Embodiments of the invention will now be described, by way of example only, and with reference to the accompanying drawings, in which:

FIG. 18b is a schematic perspective view of the second piece of the two piece flow conduit shown in FIG. 18a.

DETAILED DESCRIPTION OF THE PREFERRED EMBODIMENT

Figure 2:
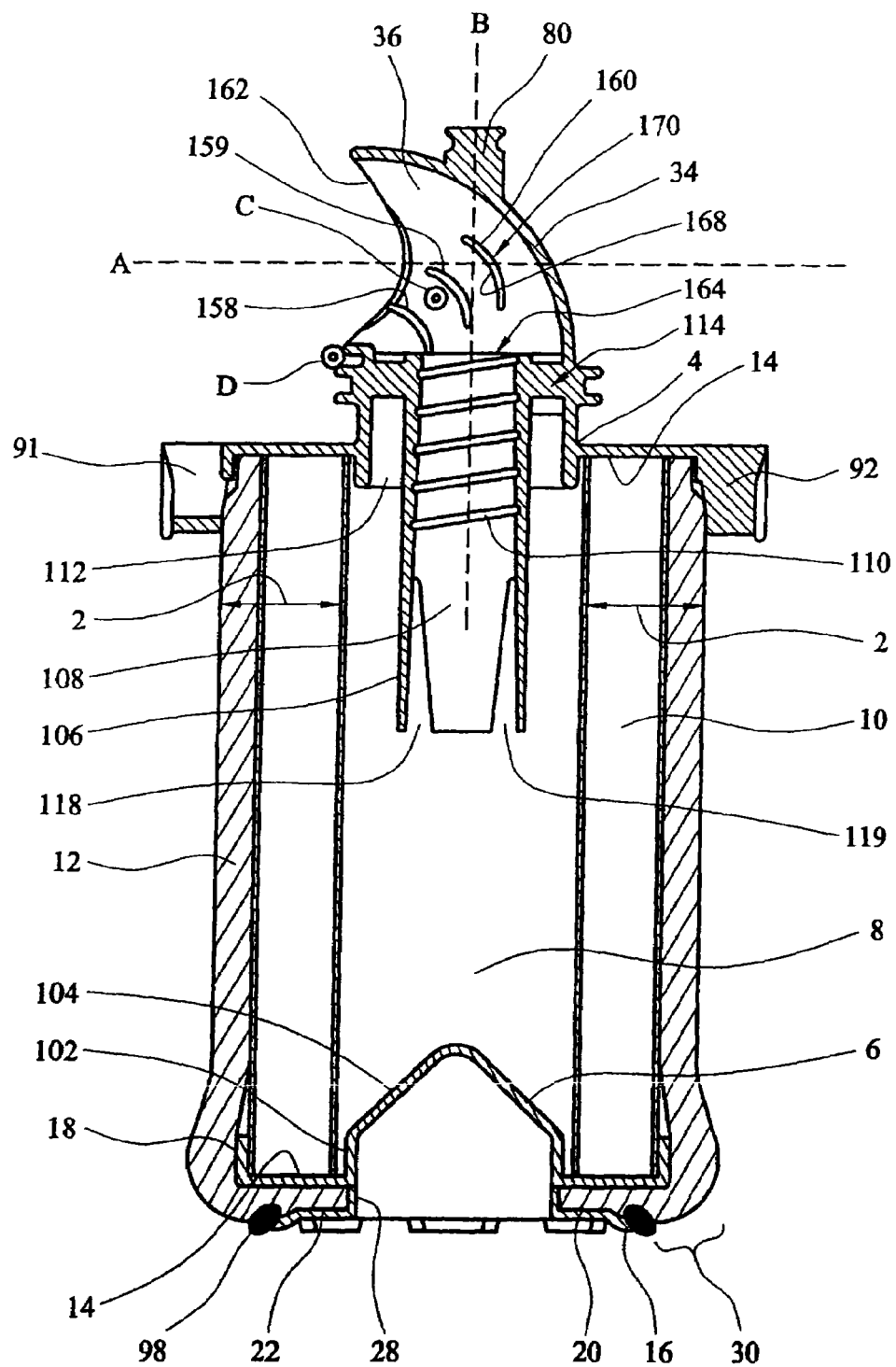
FIG. 2 is a sectional side elevation through a filter element according to the present invention.

Referring to the drawings, FIG. 2 shows a filter element which comprises a cylindrical wall section 2 formed from a filter medium, and top and bottom end caps 4 and 6.

The wall section 2 defines a hollow space 8 within it. The filter medium of the wall 2 comprises a cylindrical filtration layer 10 and a cylindrical anti-reentrainment layer or drainage layer 12 which fits snugly around the filtration layer on the outside of the filter element.

The top end cap 4 contains a flow conduit 34 which defines a flow path 36 for gas which is to be filtered. The flow conduit 34 has a port 80 in it for connection to a gauge for measuring the differential pressure across the filter element. When the filter element is located within a housing (described in more detail below) the port 80 can be received in a downwardly facing socket in the housing head, forming a seal by compression of an O-ring between the external surface of the port and the internal surface of the socket.

The flow conduit 34 has a first opening 162 having a first axis A, and a second opening 164 having a second axis B. The angle between the axes A, B of the first 162 and second 164 openings is 90°. The flow conduit 34 provides a continuous flow path between the two openings, and therefore provides a smooth change of direction for gas flowing therethrough when in use. The flow conduit 34 turns about an axis D which extends perpendicularly to the axes A, B of the first 162 and second 164 conduit openings. (As shown in FIG. 2, the axis D about which the flow conduit 34 turns extends perpendicularly to the plane along which the cross-section of FIG. 2 of the filter element is taken).

The flow conduit 34 contains first 158, second 159 and third 160 curved vanes extending perpendicularly across the flow conduit. Each vane curves around its own axis and the radius of curvature is the same for each vane. Further, the length of the vanes, measured between their leading and trailing edges, is the same for each vane. The axes around which the vanes curve extend perpendicularly to the axes A, B of the first and second conduit openings 162, 164. For example, as shown in FIG. 2, the second vane 159 curves around an axis C which extends parallel to the axis D about which the flow conduit 34 turns. The vanes each have concave 168 and convex 170 surfaces, wherein the concave surface of each vane faces the first 162 and second 164 openings of the flow conduit 34. Therefore, the vanes help guide the flow of gas between the first 162 and second 164 openings.

Figure 11:
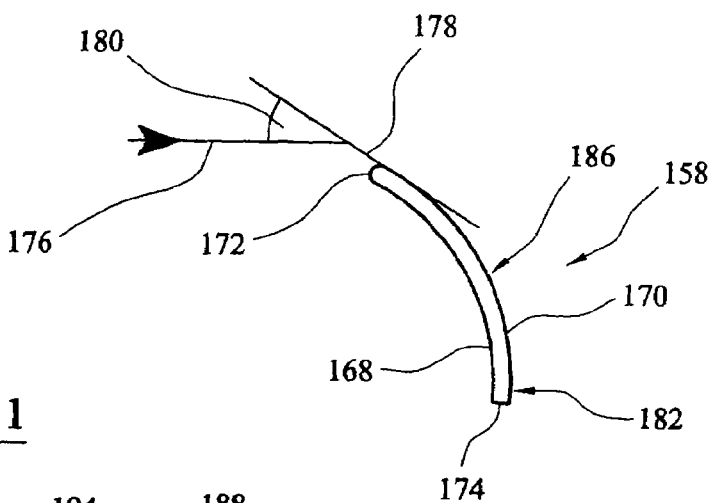
FIG. 11 is a sectional elevation of the first vane of the filter element shown in FIG. 2.

The shape and configuration of the first 158, second 159 and third 160 vanes is identical and shown in more detail with reference to the first vane 158 in FIG. 11. As shown, the first vane 158 has a rounded leading edge 172 which faces into the direction of the flow of gas 176 when the filter element is in use, and a trailing edge 174. The thickness of the first vane 158 is substantially constant between its leading and trailing edges. The vane has a straight portion 182 proximal its trailing edge 174, and a curved portion 186 extending between its leading edge and the straight portion. The length of the straight portion 182 is 5% of the total length of the vane 158 between its leading 172 and trailing 174 edges. The angle of incidence of the vane to the flow of gas when in use (i.e. the angle 180 between a straight line 176 projecting parallel to the direction of the flow of gas immediately upstream of the vane 158 and a straight line 186 projecting tangentially from the convex surface 170 of the vane at its leading edge 172) is 4°.

Figure 12:
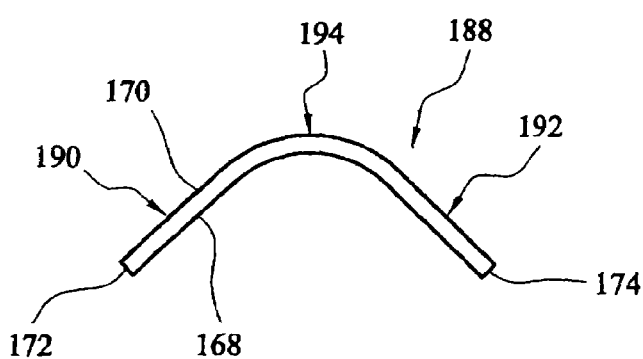
FIG. 12 is a sectional elevation of the first vane of the filter element shown in FIG. 2 according to a second embodiment.

The first 158, second 159 and third 160 vanes need not have the shape and configuration of the vane shown in FIG. 11. For example, the vanes can have the shape and configuration of an elbow shaped vane 188 as shown in FIG. 12. The elbow shaped vane 188 is substantially similar in configuration to that shown in FIG. 11 and like parts share like reference numerals. However, the elbow vane 188 has a straight leading portion 190 proximal its leading edge 172, as well as a straight trailing portion 192 proximal its trailing edge 174 and a curved portion 194 between them.

Figure 13:
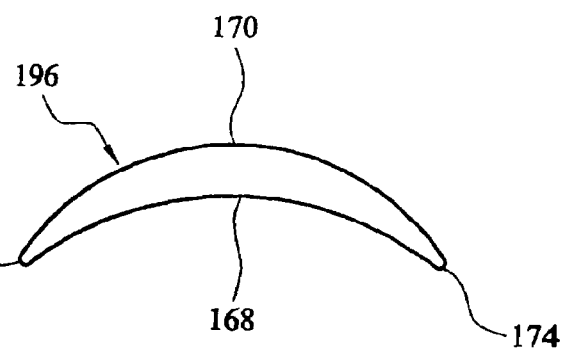
FIG. 13 is a sectional elevation of the first vane of the filter element shown in FIG. 2 according to a third embodiment.

Further, the first 158, second 159 and third 160 vanes can have the shape and configuration of the crescent shaped vane 196 shown in FIG. 13. The crescent shaped vane 196 is substantially similar in configuration to that shown in FIG. 11 and like parts share like reference numerals. However, the thickness of the crescent shaped vane 196 is not uniform between its leading 172 and trailing edges 174. Instead, the thickness of the crescent shaped vane 196 continuously increases as you travel from its leading edge 172 towards the midpoint between the leading and trailing 174 edges, and continuously decreases as you travel from the midpoint to the trailing edge.

Figure 14:
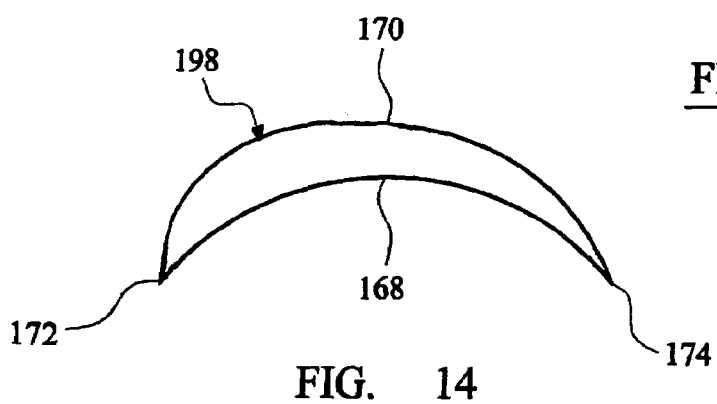
FIG. 14 is a sectional elevation of the first vane of the filter element shown in FIG. 2 according to a fourth embodiment.

Further still, the first 158, second 159 and third 160 vanes can have the shape and configuration of the curved-aerofoil shaped vane 198 shown in FIG. 14. The curved-aerofoil shaped vane 198 is similar in configuration to that shown in FIG. 11 and like parts share like reference numerals. However, the thickness of the curved-aerofoil shaped vane 196 is not uniform between its leading 172 and trailing 174 edges and is generally thicker towards its leading edge than towards its trailing edge.

Referring now back to FIG. 2, the gap/chord ratio of the first 158, second 159 and third 160 vanes shown in FIG. 2, is 0.45.

The first 158, second 159 and third 160 vanes are arranged such that radius ratio of all of the sub-flow conduits (described in more detail below in relation to FIG. 17) is at least 1.

The first 158, second 159 and third 160 vanes are arranged such that aspect ratio for all the sub-flow conduits is at least 1.

Figure 15:
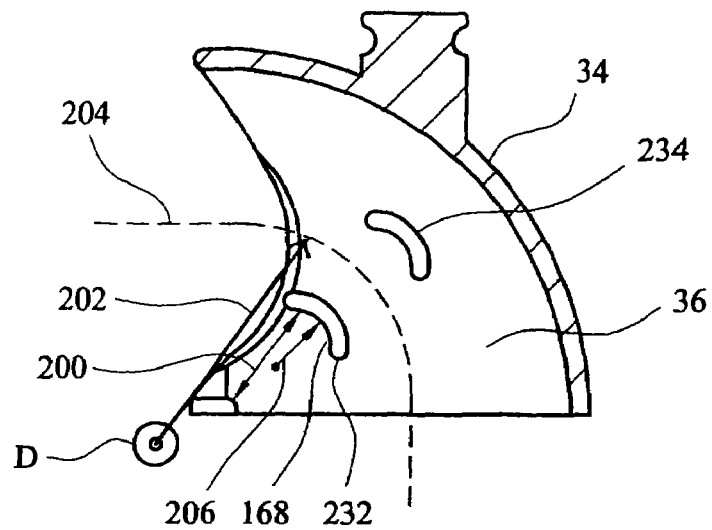
FIG. 15 is a sectional elevation view of a flow conduit according to the invention illustrating the calculation of the position of the first vane.
Figure 16:
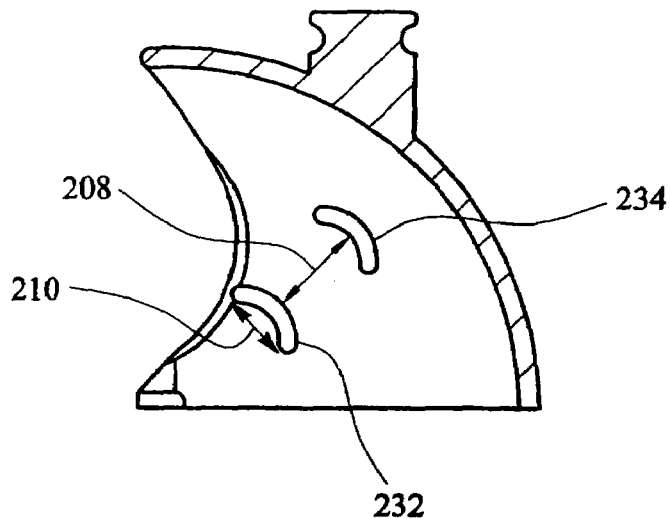
FIG. 16 is a sectional elevation view of the flow conduit shown in FIG. 15 illustrating the calculation of the gap/chord ratio of the vanes.
Figure 17:
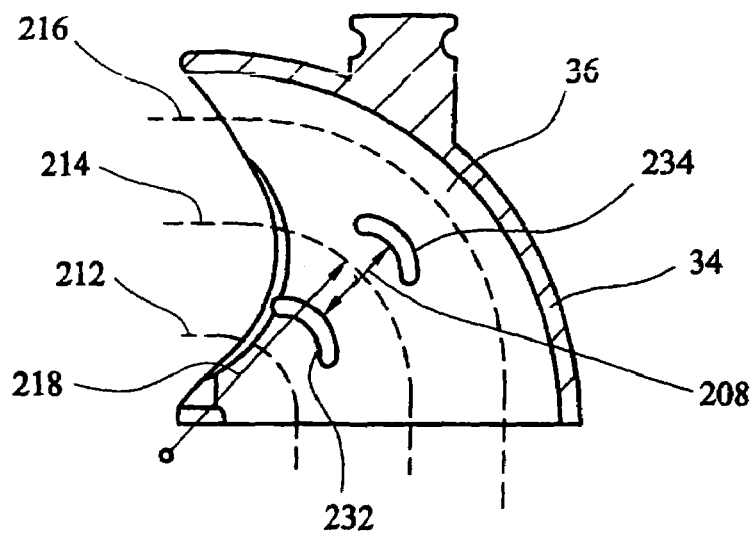
FIG. 17 is a sectional elevation view of the flow conduit shown in FIG. 15 illustrating the calculation of the radius ratio and the aspect ratio of the sub-flow conduits defined by the vanes.

FIGS. 15 to 17 illustrate how the preferred distance between the concave surface of the inner most vane and wall of the flow conduit the concave surface of the vane faces, the gap/chord ratio, and the radius ratio and aspect ratio for a flow conduit with vanes, can be calculated. For sake of simplicity of illustration, the flow conduits 34 of FIGS. 15 to 17 contain only a first vane 232 and a second vane 234. Otherwise, all other parts of the flow conduit 34 of FIG. 15 are the same as that shown in FIG. 2 and share the same reference numerals.

As illustrated in relation to FIG. 15, the preferred positioning of the inner most vane (i.e. the first vane 232) can be calculated so that the distance 200 between its concave surface 168 and wall of the flow conduit the concave surface of the vane faces, is equal to: $R - r \cos \theta/2$, where (R) is the radius of the curvature 202 of the centre line 204 of the turn of the flow conduit 34, (r) is the radius of the curvature 206 of the first vane 232, and θ is the angle between the axes of the first 162 and second 164 conduit openings (i.e. 90° as shown in FIGS. 2 and 15).

As illustrated in relation to FIG. 16, the gap/chord ratio is calculated as the ratio of the distance 208 between the midpoints of the first 232 and second 234 vanes, and the chords 210 of the vanes.

Figure 4:
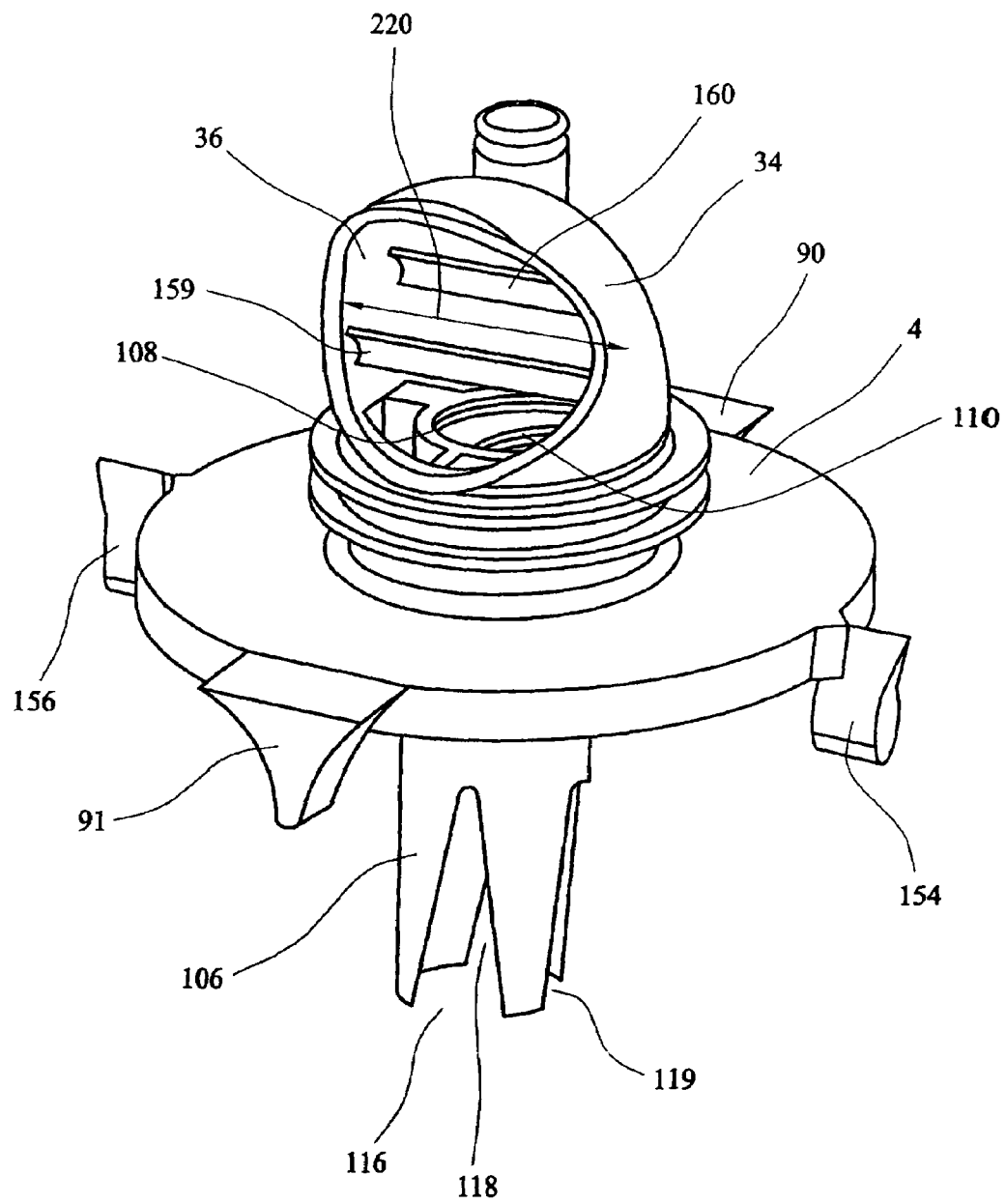
FIG. 4 is a schematic perspective view of the top end cap of the filter element shown in FIG. 2.

As illustrated in relation to FIG. 17, the first 232 and second 234 vanes divide the flow conduit 34 into first, second and third sub-flow conduits having first 212, second 214 and third 216 centre line of turns respectively. The radius ratio of the second sub-flow conduit having a centre line of turn 214, is calculated as the ratio of the radius of the curvature 218 of the centre line of the turn 214 of the second sub-flow conduit to the width 208 of the sub-flow conduit measured between the first 232 and second 233 vanes. Still referring to FIG. 17, the aspect ratio of the second sub-flow conduit having a centre line of turn 214 is calculated as the ratio of the depth of the second sub-flow conduit to the width 208 of the second sub-flow conduit measured between the vanes. As shown in FIG. 4, the depth of a sub-flow conduit is the distance 220 between the opposing walls of the flow conduit 34 between which the vanes that define the sub-flow conduit extend.

Referring now to FIG. 2, the flow conduit 34 and the top end cap 4 of the filter element are formed as separate pieces. Further, the flow conduit 34 is formed from two pieces.

Figure 18A:
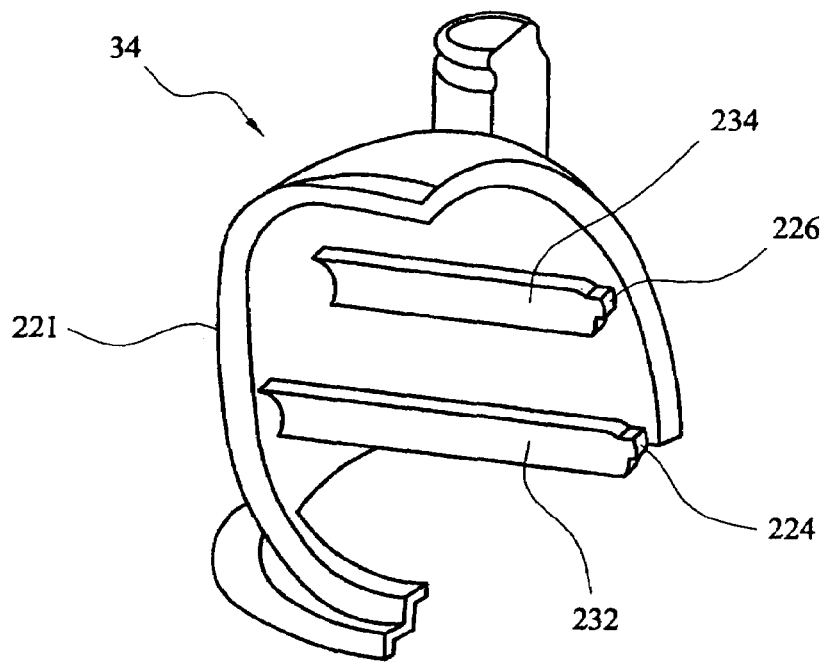
FIG. 18a is a schematic perspective view of the first piece of a two piece flow conduit according to the invention.
Figure 18B:
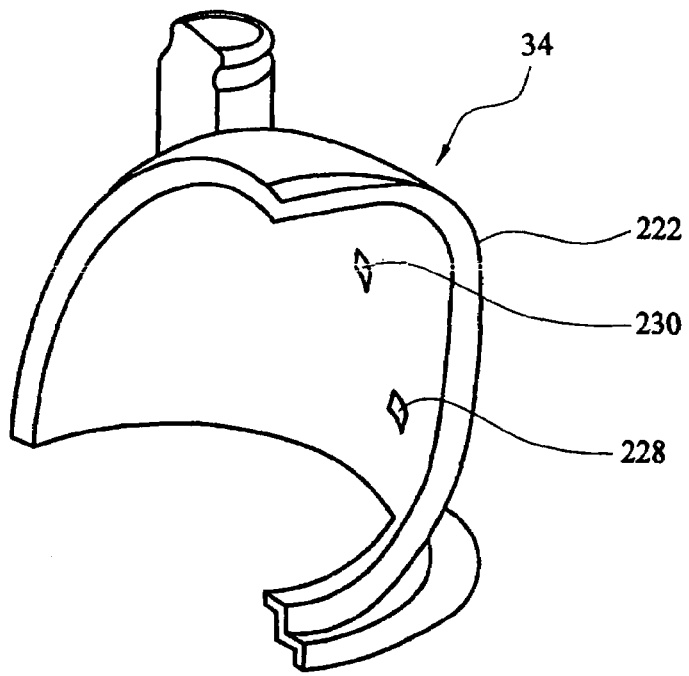

A two piece flow conduit 34 is shown in FIGS. 18a and 18b. For sake of simplicity, the flow conduit 34 of FIGS. 18a and 18b contains only a first vane 232 and a second vane 234. Otherwise, all other parts of the flow conduit 34 of FIG. 15 are the same as that shown in FIG. 2 and share the same reference numerals. With reference to FIGS. 18a and 18b, the flow conduit 34 comprises first 221 and second 222 matable pieces. The first 221 and second 222 pieces are mirror images of each other (the plane of symmetry of the pieces extending through both the axes of the first 162 and second 164 conduit openings) except that the first 232 and second 234 vanes extend from, and are part of, the first piece 221 of the flow conduit 34. The first 232 and second 234 vanes have respective tangs 224, 226 at their free ends (i.e. the ends distal to the wall of the first piece 220 from which the vanes extend) that can be received within corresponding recesses 228, 230 formed in the wall of the second piece 222 of the flow conduit 34. Therefore, when the first 221 and second 222 pieces are brought together to form the flow conduit 34, the tangs 224, 226 are received within the corresponding recesses 228, 230 so that the first 232 and second 234 vanes are secured to the second piece 222 at their free ends.

Referring back to FIG. 2, the top end cap 4 further comprises an inlet tube 106, co-axial with the top end cap 4, which extends from the second conduit opening 164 of the flow conduit 34 part way into the hollow space 8 to a downstream open end. In this embodiment, the inlet tube 106 and top end cap 4 are one piece. However, it will be appreciated that they need not be one piece. The inlet tube 106 defines a flow path 108 for gas which is to be filtered and is in fluid connection with the flow path 36 of the top end cap 4.

The top end cap 4 has annular opening 112 extending around the inlet tube 106 proximal to the flow conduit 34. The inlet tube 106 is held within the annular 112 opening by fins 114 that extend between the top end cap 4 and the inlet tube 106.

Figure 3:
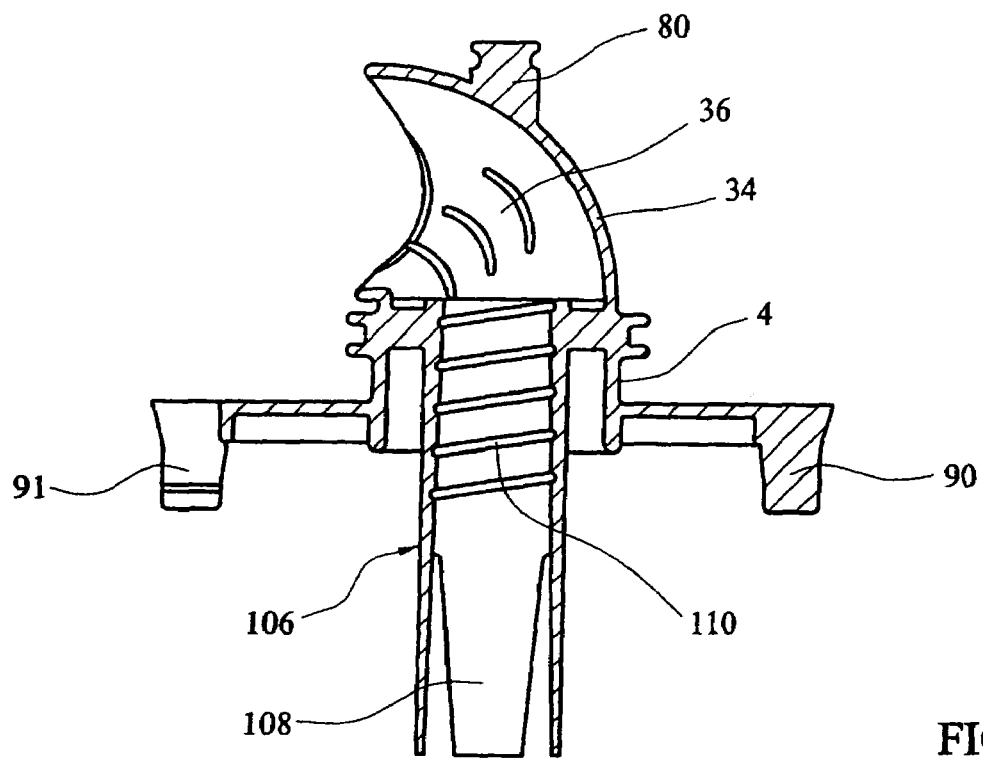
FIG. 3 is a sectional side elevation of the top end cap of the filter element shown in FIG. 2.

As best shown in FIG. 3, the inlet tube 106 has a rifling formation defined on its inner wall, extending from its end proximal to the top end cap 4, part way towards its end distal to the top end cap. The rifling formation is provided by a helically extending ridge 110 on the inner wall of the inlet tube 106.

Referring now to FIG. 4, a schematic perspective view of the top end cap 4 of FIG. 2 is shown. For simplicity and to enable illustration of the helically extending groove 110, the first vane 158 is not shown. As shown, the inlet tube 106 has first 116, second 118, third 119 and fourth (not shown) openings in its side wall. The openings are in the form of slits that taper uniformly from an open end at the downstream open end of the inlet tube 106, to a point towards the upstream open end of the inlet tube. Therefore, the proportion of the side wall of the inlet tube 106 that is open, increases towards the downstream open end of the inlet tube. The slits extend along 50% of the length of the inlet tube and in a direction parallel to the axis of the inlet tube. The slits are positioned equally around the inlet tube 106, i.e. they are spaced apart from each other by about 90E around the inlet tube.

FIGS. 6 to 10 show alternative embodiments of inlet tubes according to the invention that can be used with the top end cap 4 of FIG. 2. The top end caps 4 shown in FIGS. 6 to 10 are the same as that shown in FIG. 2. However, for simplicity, the first 158, second 159 and third 160 vanes, and also the helically extending ridge 110, are not shown.

Figure 6:
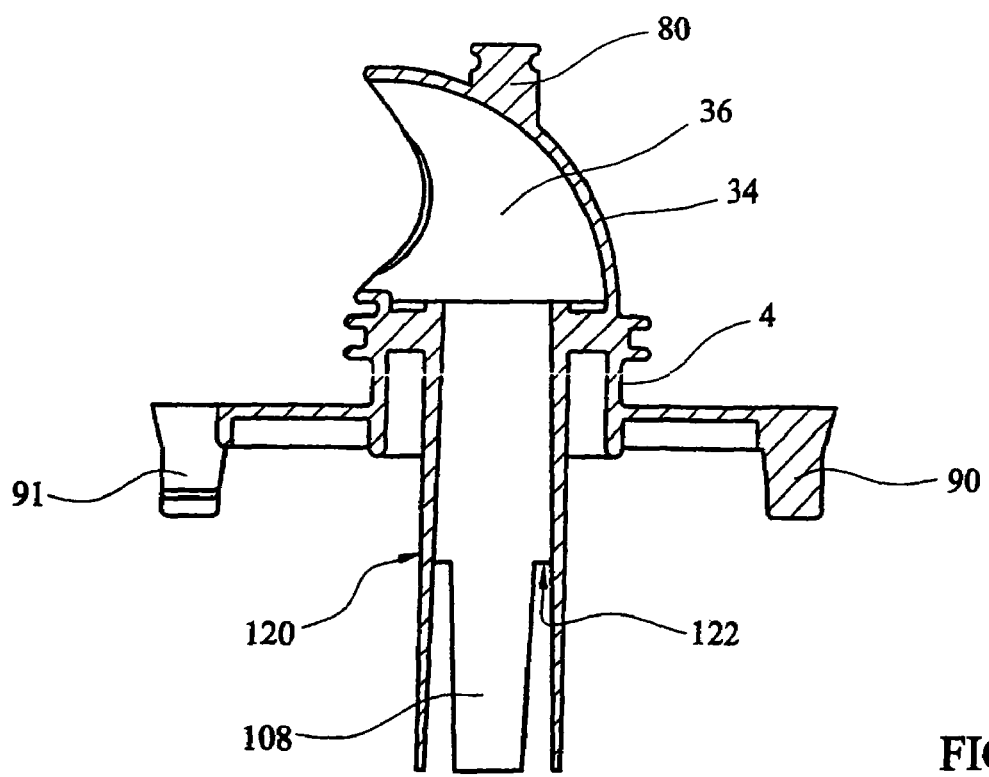
FIG. 6 is a schematic sectional elevation of the top end cap of the filter element shown in FIG. 2 illustrating a second embodiment of the inlet tube of the filter element.

FIG. 6 shows an inlet tube 120 according to the invention which is similar in configuration to that shown in FIG. 2, except that the first, second, third and fourth slits taper to a flat end 122, instead of to a point.

Figure 7:
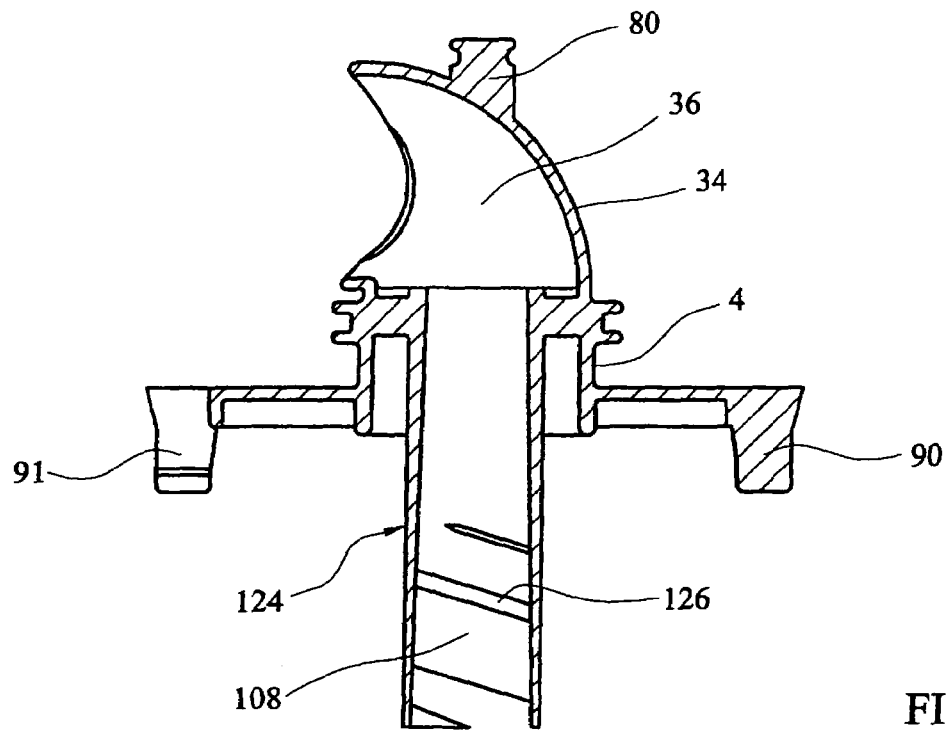
FIG. 7 is a schematic sectional elevation of the top end cap of the filter element shown in FIG. 2 illustrating a third embodiment of the inlet tube of the filter element.

FIG. 7 shows an inlet tube 124 which is similar in configuration to that shown in FIG. 2, except that the inlet tube 124 only has one opening 126, which is in the form of a helically extending slit. The helically extending slit extends from an open end at the downstream open end of the inlet tube 124, to a point towards the upstream open end of the inlet tube. As shown, the angle between the plane perpendicular to the axis of the inlet tube 124 and a straight line projecting substantially along a portion of the slit 126 is constant. However, the width of the helically extending slit 126, taken perpendicular to the straight line projecting substantially along a portion of the slit, decreases towards the upstream open end. Therefore, the proportion of the side wall of the inlet tube 124 that is open, increases towards the downstream open end of the inlet tube.

Figure 8:
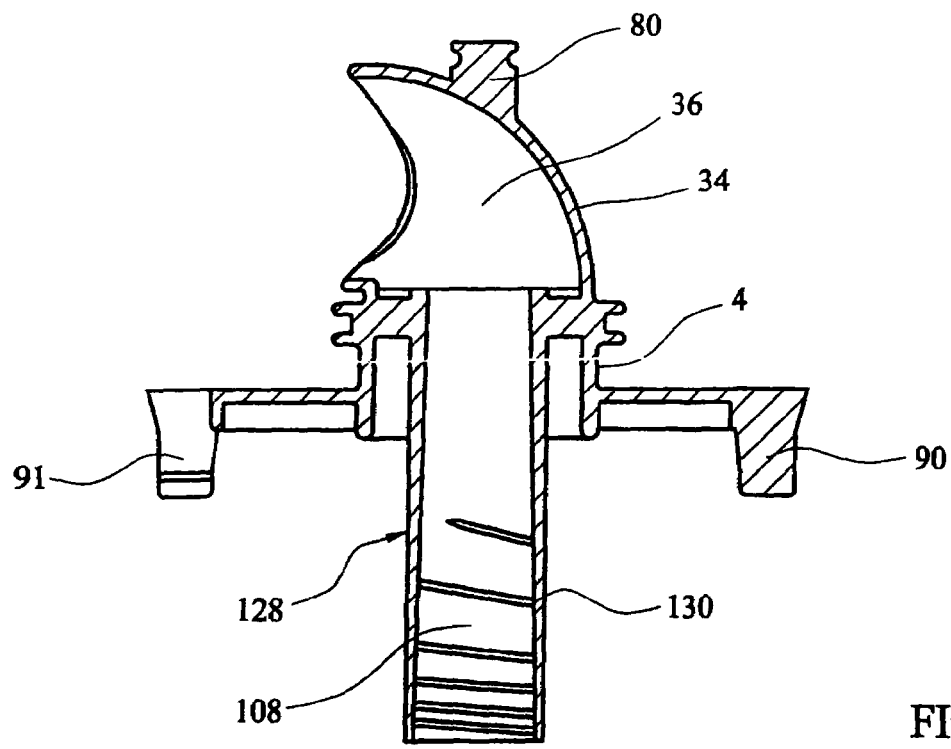
FIG. 8 is a schematic sectional elevation of the top end cap of the filter element shown in FIG. 2 illustrating a fourth embodiment of the inlet tube of the filter element.

FIG. 8 shows an inlet tube 128 which is similar in configuration to that shown in FIG. 7 in that the inlet tube 128 only has one opening 130 in the form of a helically extending slit. However, in contrast to the inlet tube 124 shown in FIG. 7, the width of the slit 130 shown in FIG. 8 in constant along its entire length. Further, the angle between the plane perpendicular to the axis of the inlet tube 128 and a straight line projecting substantially along a portion of the slit 130 decreases towards the downstream open end of the inlet tube. Therefore, the proportion of the side wall of the inlet tube 128 that is open, increases towards the downstream open end of the inlet tube.

Figure 9:
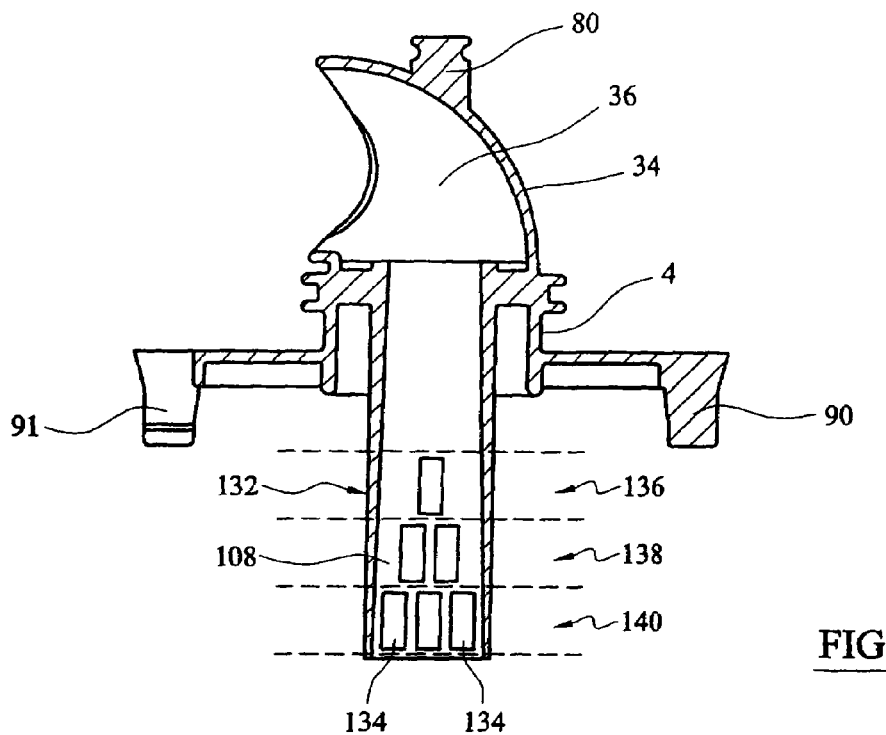
FIG. 9 is a schematic sectional elevation of the top end cap of the filter element shown in FIG. 2 illustrating a fifth embodiment of the inlet tube of the filter element.

FIG. 9 shows an inlet tube 132 which is similar in configuration to that shown in FIG. 2, except that the side wall has a plurality of openings 134 in the form of apertures. The apertures can be identified as wholly falling within three bands (an upstream band, designated generally by 136, a middlestream band 138, and a downstream band 140), extending around the inlet tube, each band defining a plane perpendicular to the axis of the inlet tube. The upstream band 136 is located within the downstream half of the inlet tube 132. Four apertures (only one of which can be seen in FIG. 9) are present in the upstream band 136, eight apertures (only two of which can be seen in FIG. 9) are present in the middlestream band 138, and twelve apertures (only three of which can be seen in FIG. 9) are present in the downstream band 140. The apertures have two equal length, straight, parallel sides, and has a convex end at each end of the aperture that extends between the parallel sides. The length of the parallel sides is longer than the transverse distance between them. All of the apertures 134 are equal in shape and dimension.

The four apertures in the upstream band 136 are positioned equally around the inlet tube 132, i.e. they are spaced apart from each other by about 90° around the inlet tube. The eight apertures in the middlestream band 138 are divided into four sets of two apertures. The four sets of two apertures are positioned equally around the inlet tube 132, i.e. they are spaced apart from each other by about 90° around the inlet tube. The twelve apertures in the downstream band 140 are divided into four sets of three apertures. The four sets of three apertures are positioned equally around the inlet tube 132, i.e. they are spaced apart from each other by about 90E around the inlet tube. Therefore, the proportion of the side wall of the inlet tube 132 that is open increases towards the downstream open end of the inlet tube.

Figure 10:
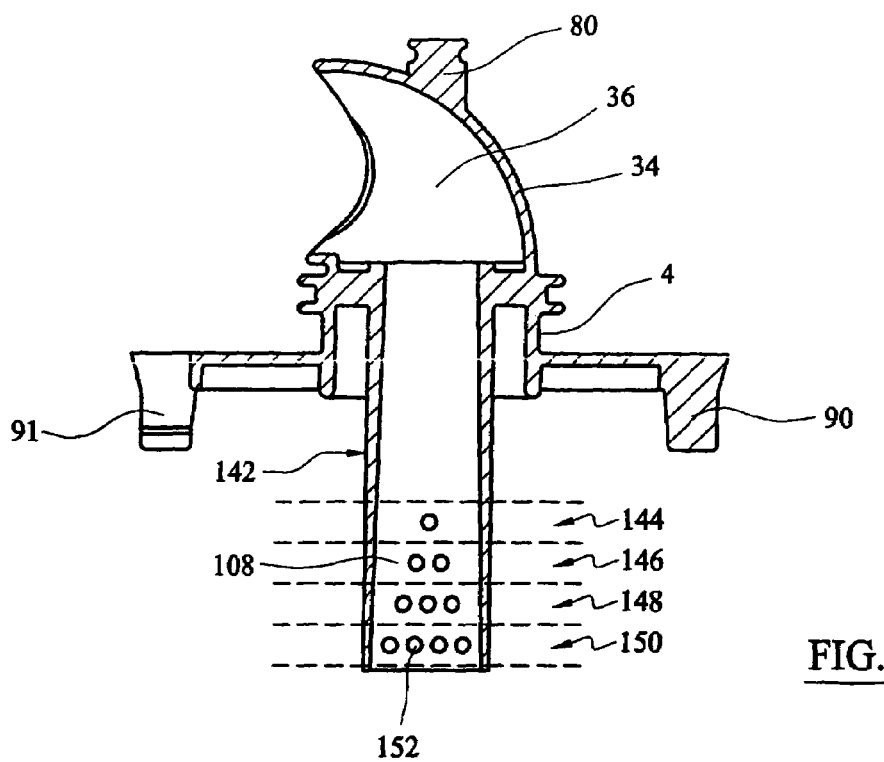
FIG. 10 is a schematic sectional elevation of the top end cap of the filter element shown in FIG. 2 illustrating a sixth embodiment of the inlet tube of the filter element.

FIG. 10 shows an inlet tube 142 which is similar in configuration to that shown in FIG. 9, except that the apertures 152 are circular in shape, and that four bands (an upstream band, designated generally by 144, an upstream middlestream band 146, a downstream middlestream band 148, and a downstream band 150) can be identified instead of three. Four apertures (only one of which can be seen in FIG. 10) are present in the upstream band 144, eight apertures (only two of which can be seen in FIG. 10) are present in the upstream middlestream band 146, twelve apertures (only three of which can be seen in FIG. 10) are present in the downstream middlestream band 148, and sixteen apertures (only four of which can be seen in FIG. 10) are present in the downstream band 150.

Referring back to FIG. 2, each of the end caps has a trough 14 formed in it. The top part of the filtration layer 10 and the drainage layer 12 are retained and sealed in the trough 14 of the top end cap 4, and the bottom part of the filtration layer is retained and sealed in the trough 14 of the bottom end cap 6.

The bottom end cap 6 further comprises a flange part 16, spaced apart from the surface 20 of the second end cap facing away from the top end cap 4. The flange part 16 extends generally transverse to the axis of the filter element. The flange part 16 is located centrally with respect to the bottom end cap 6, and is spaced from it by a co-axial stem 28 extending between them. The flange part 16 and second end cap 6 between them define an annular slot 22, in which the drainage layer can be received. The slot is tapered inwardly so that the distance between the flange and the surface of the end cap decreases progressively. The slot is therefore generally V-shaped when the end cap is viewed from one side.

The bottom part of the drainage layer 12 is wrapped over the wall 18 of the trough 14 of the bottom end cap 6 and folded under its bottom surface 20, in the annular slot 22 between the second end cap 6 and the flange part 16. The drainage layer 12 is fastened in the space 22 by means of a loop of elastic material 98, such as an elastic band or O-ring, which can be stretched to fit over the flange. The loop 98 is sized so that it is pinched between the opposing surfaces of the slot and the drainage layer: the transverse dimension of the material of the loop is slightly greater than the distance between the drainage layer and the opposing surface of the slot when the tension in the loop (resulting from stretching it to fit it over the flange) is relaxed. This causes the loop and the drainage layer to be compressed slightly, so that the drainage layer is gripped in the annular slot. The diameter of the flange is smaller than the diameter of the end cap so that at least a part 30 of the drainage layer 12 folded over the bottom surface 20 is exposed.

The bottom end cap 6 also has a central upstand portion 100. The central upstand portion 100 extends from the bottom of the hollow space defined by the bottom end cap 6 towards the first end cap. The central upstand portion 100 has a generally cylindrical base 102, and a generally conical part 104 extending from the base toward the first end cap 4. The diameter of the cylindrical base 102 is the same as that of the stem 28.

Figure 1:
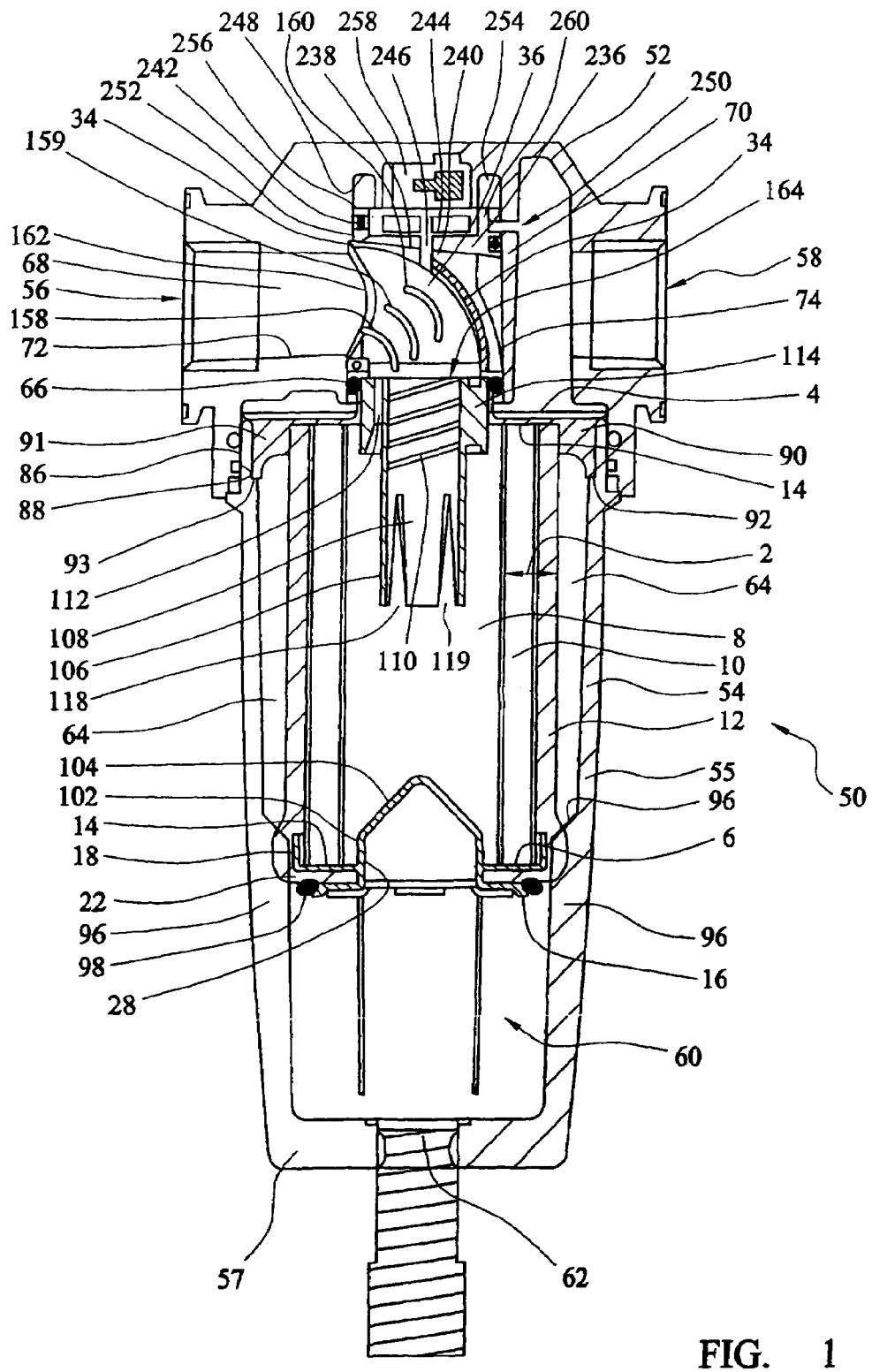
FIG. 1 is sectional side elevation through a filter assembly according to the present invention which comprises a filter element and the housing in which the element is located when in use.

Referring now to FIG. 1, an assembly according to the present invention is shown which includes a housing 50 in which the filter element shown in FIG. 2 can be located when in use. However, as shown, an alternative embodiment of a filter element which is substantially the same as that shown in FIG. 2, is located within the housing.

The filter element shown in FIG. 1 is substantially the same as that shown in FIG. 2, except that an extension 236 is provided on the external wall of the flow conduit 34 and extends away from the second conduit opening 164, instead of the port 80 for connection to a gauge. The extension 236 has seating portion 238 having a generally circular cross-section, and a fin 240 having a generally planar configuration which extends between the seating portion 238 and the flow conduit 34. The seating portion 238 provides a generally flat surface 244 and a wall 256 which extends around the periphery of the surface and away from the second conduit opening 164. A differential pressure measuring device (discussed in more details below) can be received by and contained within the area defined by the surface 244 and wall 256 of the seating portion. The extension 236 is configured so that the axis of the circular seating portion 238 is angled relative to the axis of the second conduit opening 164 by 5°. Therefore, as shown in FIG. 1, when viewed in cross-section, the seating portion 238 appears slanted relative to the filter element. A groove 242 that is capable of receiving an O-ring is formed around the periphery of the wall 256. A vent 246 that extends between the flow path 36 of the flow conduit 34 and the surface 244 of the seating portion 238 is formed within the extension 236.

The housing comprises a head 52 and a body 54 which can be connected to one another by means of cooperating screw threads (as is well established) at their interfaces 86, 88. The head and body are formed from a metallic material, especially aluminium or an alloy thereof. They can be formed by machining, or by techniques such as casting.

The housing body comprises a cylindrical wall 55, an end wall 57 at one end of the internal wall, and an open end at the opposite end of the cylindrical wall. The housing body defines a space within which the filter element is coaxially located when in use. Liquid drops which drain from the drainage layer are collected in a reservoir 60 in the housing body. The housing includes a drain outlet 62, for example of the kind which is disclosed in European Patent No. EP-A-81826.

Figure 5:
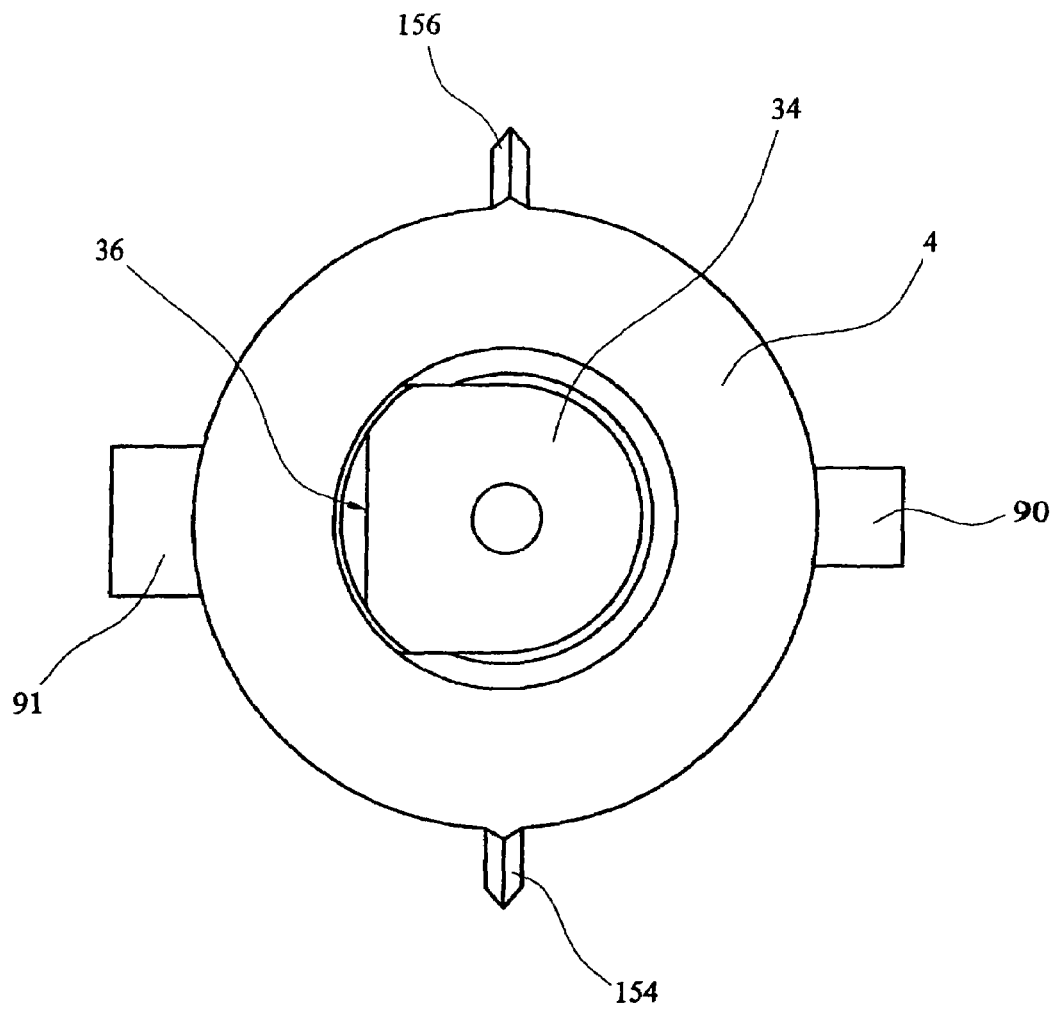
FIG. 5 is a schematic top view of the top end cap of the filter element shown in FIG. 2.

The filter element fits on to the housing body by means of inter-engaging formations in the form of ribs and grooves. The top end cap 4 has first 90, second 91, third 154 and fourth 156 ribs (for example as shown in FIGS. 4 and 5) around its perimeter that extend from the top end cap towards the bottom end cap, on the exterior of the filter element. The four ribs are spaced apart about 90° around the top end cap. Further, the first 90 and second 91 ribs are spaced about 180° around the top end cap. The first 90 and second 91 ribs are received in the housing body by means of correspondingly shaped and positioned first 92, second 93, grooves provided in the interior of the housing body at the open end.

The third and fourth ribs 154, 156 are identical in shape size and configuration. The leading edge of the third and fourth ribs 154, 156 (which is directed into the gas stream) is rounded and the trailing edge of the rib is tapered inwardly, towards (optionally to) a sharp edge or point. These ribs 154, 156 are approximately aerofoil-shaped when viewed in cross-section (perpendicular to the axis of the assembly). This shape gives minimal resistance to the flow of gas past the ribs. In contrast to the first 90 and second 91 ribs, there are no corresponding grooves for the third 154 and fourth 156 ribs. Instead, the axial faces of the third 154 and fourth 156 ribs match the profile of the housing body so that they rest against the body when the filter element has been fitted within the housing body.

The first and second ribs 91, 90 are shaped differently to that of third and fourth ribs 154, 156. The leading edge of the first and second ribs 90, 91 are rounded, and the trailing end is flared outward from the rounded leading edge. The first and second ribs 90, 91 have an approximately tapered "V" shape when viewed in cross-section (perpendicular to the axis of the assembly) with a flat top surface extending between the ends of the "V".

As can be seen in FIG. 1, the second rib 91 is located under the internal cylindrical wall 72 of the head 52 of the housing 50 (discussed in more detail below). Therefore, when the filter assembly is in use, the tapered sides of the second rib 91 aids the flow gas around the internal cylindrical wall 72, and towards the outlet port 58. The first rib 90 is located below the output port 58. Therefore, in order to minimise the direction of gas away from the output port, the width of the first rib 90 at its widest point is smaller than that of the second rib 91. Further, due to the first rib 90 and its corresponding first groove 92 being narrower than the second rib 91 and its corresponding second groove 93, the filter element can only be inserted into the body in one orientation. This can ensure that when the housing is assembled, the inlet port 56 of the housing head 52 (described in more detail below) is aligned with the flow conduit 34 of the top end cap 4, rather than incorrectly aligned with the outlet port 58 of the housing head. This is especially true when the housing head and body are configured so that they can only fit together in one orientation. This can be achieved by providing a single start screw thread at the interfaces 86, 88 of the housing head and body.

The filter element is assembled in the housing body by locating the first and second ribs 90, 91 with the first and second grooves 92, 93 of the housing body 54, and then sliding the ribs into the grooves until they sit on the bottom of the grooves. Once the ribs have been fully received by the grooves, the filter element is securely suspended within the housing body. Therefore, as will be appreciated, the axial position of the filter element within the housing body can be controlled by the shape and size of the ribs and grooves. Further, rotation of the filter element relative to the housing body is inhibited by the interlocking of the ribs with the grooves.

Once the filter element is appropriately assembled in the housing body, an annular space 64 is defined between the filter element and the housing. The filter element can be removed from the housing body 54, by pulling the filter element away from the housing body along its axis.

The housing body 54 has two a plurality of fins 96 extending along the cylindrical wall 55, parallel to the axis of the housing body. The number of fins 96 provided on the cylindrical wall 55 of the housing body 54 can depend on the size of the housing body. For example, in general, the larger the housing body, the greater the number of fins 96 provided. Typically, the minimum number of fins 96 provided will be two. In the embodiment shown, the housing body has six fins 96, however, only two are shown. The fins extend from the end wall 57 of the housing body towards the open end, and are spaced uniformly around the cylindrical wall 55 of the housing body 54. When the filter element is assembled in the housing body so that the ribs have been fully received within the grooves, the part of the drainage layer 12 which extends over the bottom end cap 6 is compressed between the bottom end cap and the edge of the fins 96. Accordingly, the transverse position of the filter element within the housing body can be controlled by the shape and size of the fins. The cross-section of the edge of the fins which contacts the drainage layer, taken perpendicular to the length of the ridge, is a rounded convex shape. As a result of the local compression of the drainage layer between the fins and the second end cap, liquid collected in the drainage layer is encouraged to drain from it, along each fin.

The housing head includes an inlet port 56 which communicates with the flow conduit 34 on the top end cap 4 through a transversely extending primary chamber 68 within the housing head. The primary chamber 68 is defined by an internal cylindrical wall 72 extending transversely within the housing head, and an internal end wall 70 opposite the inlet port 56. The internal cylindrical side wall 72 and end wall 70 are integral to the housing head. A first circular aperture 74, coaxial with the housing head, is defined within the part of side wall of the inlet conduit that is proximal to the filter element when assembled. A recess 248, that extends away from the filter element when the assembly is assembled, and that is coaxial with the housing head, is formed within the primary chamber 68. Further, a vent 250 that extends between the primary chamber 68 and the area surrounding it is formed in the end wall 70.

The housing head 52 is secured to the body 54 (once the filter element has been located in the housing body) by locating the flow conduit 34 of the top end cap 4 in the primary chamber 68 of the housing head through the circular aperture 74. The flow conduit 34 has an O-ring 66 on its external surface which is received by the aperture 74, in which it is compressed to form a fluid tight seal. The seating portion 238 also has an O-ring 252 which is compressed between the groove 242 of the seating portion and the side wall of the recess 248 within primary chamber 68, to form a fluid tight seal, thereby defining an auxiliary chamber 254 within the primary chamber.

The housing head 52 and body 54 are secured by rotating one relative to the other so that their cooperating screw threads at their interfaces 86, 88, are tightened to interlock with each other. Once the head is properly secured to the body 54 the vent 250 in the end wall 70 of the housing head 52 extends between the auxiliary chamber 254 and the area within the housing head surrounding the primary chamber 68.

A device 258 for measuring differential pressure is contained within the area defined by the surface 244 and the wall 256 of the seating portion 238. Suitable differential pressure measuring devices are known in existing products, for example in products sold by Domnick Hunter Limited under the trade mark OIL-X. The device 258 can be secured to the seating portion 238 by frictional forces between it and the wall 256 of the seating portion 238; i.e. the device is a secured to the seating portion 238 by a "press-fit" connection. However, other techniques can be used to secure the pressure measuring device, for example a threaded engagement or an adhesive. An O-ring 260 is provided on the pressure measuring device 258 which is compressed between the device and the wall 256 to provide a fluid tight seal between the vent 246 within the extension 236 and the axiliary chamber 254. As the vent 246 within the extension 236 is in fluid communication with gas upstream of the filter element and the auxiliary chamber 254 is in fluid communication with gas downstream of the filter element via the vent 250 in the end wall 70, the pressure measuring device is capable of measuring the pressure drop across the filter element.

The filter assembly can be disassembled by rotating the housing body 54 relative to the head 52 so that their cooperating screw threads are loosened. Any rotational force that is imparted on the top end cap 4 of the filter element by frictional forces between the O-rings 66, 252 of the end cap 4 and the housing head is negated by the opposite rotational drive that is provided by the first and second ribs 90, 91 acting against the first and second grooves 92, 93 in the housing body in which the ribs are received. Therefore, as the housing body 54 is rotated relative to the housing head 52, the filter element will tend to reside in the housing rather than be drawn away from the body with the head, and hence when the housing head 52 is removed from the housing body 54, the filter element will remain located within the body, rather than being removed from the body with the head.

The housing head includes an outlet port 58 through which gas which has passed through the wall 2 of the filter element can be supplied to a downstream application. The outlet port communicates with the annular space 64 between the wall of the filter element and the internal wall of the housing.

In use, a gas that is to be filtered enters the filter assembly through the inlet port 56 in the housing head and is directed to the hollow space 8 in the filter element by means of the primary chamber 68 in the housing head and the flow paths, 36 and 109 in the flow conduit of the filter element, and the inlet tube, respectively. A helical flow is imparted in the gas stream entering the hollow space 8 by the helically extending ridge 110, as the gas stream passes through the inlet tube. The supply of gas entering the hollow space 8 is graded due to the gradual increase in the proportion of the inlet tube that is open towards its downstream end.

From the hollow space 8, the gas flows generally radially outwardly through the filter medium of the wall 2. Any liquid in the gas stream will be coalesced by the filtration layer 10 and any coalesced liquid will be carried to the drainage layer 12 by the flow of gas, where the liquid will be retained. The liquid will tend to drain to the bottom of the drainage layer 12, where it can tend to accumulate in the part of the drainage layer 12 folded under the bottom surface 12, thereby forming a wet band. When that part of the drainage layer 12 becomes sufficiently saturated, the liquid will begin to drain from any exposed parts of that part of the drainage layer, generally in the form of drops. The compression of the drainage layer 12 by the fins 96 will tend to encourage the drainage of liquid from the drainage layer along the fins.

Filtered gas exiting the filter element enters the annular space 64 between the filter element and the housing. Filtered gas is then discharged from the filter assembly through the outlet port 58 in the housing head 52, which is in fluid communication with the annular space 64. Gas flowing from the annular space 64 to the outlet port 58 is directed around the internal cylindrical wall 72 of the housing head 52, and toward the outlet port, by the tapered rib 91 that is located directly underneath the cylindrical side wall.

What is claimed is:

1. A filter element for removing material that is entrained in a gas stream, the filter element comprising:
    a wall of a filtration medium which defines a hollow space, for a gas stream to flow from the space through the wall, and
    an end cap having an inlet tube for a gas stream to be supplied to the space, the tube having at least one helically extending rifle formation in its internal wall by which a helical flow is imparted to the gas stream when it leaves the tube.

2. A filter element as claimed in claim 1, in which the rifle formation is provided by at least one ridge which is provided on the internal wall of the tube.

3. A filter element as claimed in claim 2, in which the rifle formation comprises a plurality of ridges which are arranged so that the distance between adjacent ridges is approximately constant over the length of the ridges.

4. A filter element as claimed in claim 2, in which the ridge is tapered towards a point at least one of its ends.

5. A filter element as claimed in claim 1, in which the rifle formation is provided by at least one groove which is provided on the internal wall of the tube.

6. A filter element as claimed in claim 5, in which the groove is defined by two ridges which are provided on the internal wall of the tube.

7. A filter element as claimed in claim 1, in which the helix angle defined by the formation is at least about 5°.

8. A filter element as claimed in claim 1, in which the helix angle defined by the formation is not more than about 75°.

9. A filter element as claimed in claim 1, in which the tube extends into the hollow space that is defined by the wall of the filtration medium.

10. A filter element as claimed in claim 9, in which the tube has at least one opening in its side wall through which a gas stream within the tube can leave the tube, other than at the end of the tube that is within the hollow space.

11. A filter element as claimed in claim 10, in which the opening is in the form of a slit.

12. A filter element as claimed in claim 1, in which the rifle formation extends through at least 360° between its ends.

13. A filter element as claimed in claim 1, in which the ratio of the depth of the rifle formation to the transverse dimension of the tube is at least about 0.02.

14. A filter element as claimed in claim 1, in which the depth of the rifle formation is at least about 0.5 mm.

15. A filter assembly which comprises a filter element as claimed in any one of the preceding claims, and a housing in which the filter element can be fitted when in use.

16. A filter assembly as claimed in claim 15, in which the housing comprises a head part and a body part, which can be separated to provide access to the interior of the housing.

* * * * *